(12) United States Patent
LaPalme (10) Patent No.: US 7,216,119 B1
(45) Date of Patent: May 8, 2007

(54) METHOD AND APPARATUS FOR INTELLIGENT INFORMATION RETRIEVAL

(75) Inventor: Richard J. LaPalme, State College, PA (US)

(73) Assignee: Raytheon Company, Waltham, MA (US)

( * ) Notice: Subject to any disclaimer, the term of this patent is extended or adjusted under 35 U.S.C. 154(b) by 687 days.

(21) Appl. No.: 10/177,985

(22) Filed: Jun. 20, 2002

(51) Int. Cl.
*G06F 17/30* (2006.01)

(52) U.S. Cl. ............... 707/3; 707/102; 707/103 R; 707/104.1

(58) Field of Classification Search ........... 707/1–10, 707/100–104.1, 200–206, 103 R; 706/45–52; 345/595
See application file for complete search history.

(56) References Cited

U.S. PATENT DOCUMENTS

| | | | |
|---|---|---|---|
| 5,675,819 A * | 10/1997 | Schuetze | 707/3 |
| 6,490,579 B1 * | 12/2002 | Gao et al. | 707/4 |
| 6,658,412 B1 * | 12/2003 | Jenkins et al. | 707/5 |
| 2002/0004764 A1 * | 1/2002 | Stolze et al. | 705/27 |
| 2002/0087408 A1 * | 7/2002 | Burnett | 705/14 |
| 2002/0087525 A1 * | 7/2002 | Abbott et al. | 707/3 |

FOREIGN PATENT DOCUMENTS

| WO | WO 98/04061 | 1/1998 |
|---|---|---|
| WO | WO 01/88848 A2 | 11/2001 |

OTHER PUBLICATIONS

Wiesman, et al., "Information retrieval: an overview of system characteristics", International Journal of Medical Informatics, vol. 47, pp. 5-26, 1997.

Shyu, et al., "A Bayesian Network-Based Expert Query System for a Distributed Database System", 2000 IEEE International Conference on Systems, Man and Cybernetics, pp. 2074-2079, 2000.

\* cited by examiner

*Primary Examiner*—Isaac Woo
(74) *Attorney, Agent, or Firm*—Baker Botts L.L.P.

(57) ABSTRACT

An apparatus includes a computer system which maintains a list of informational products, and accepts input from a user in a user context familiar to the user. The computer system maintains expert information developed by at least one expert, which provides correlation between the user context and informational products in the list. The computer system selects a subset of the products as a function of the user input and the expert information.

8 Claims, 7 Drawing Sheets

| ATTRIBUTES |
| --- |
| TARGET NAME |
| TARGET ID NUMBER |
| TIME ON TARGET |
| TARGET LOCATION |
| DAYLIGHT VISIBLE |
| GEO-RECTIFIED |
| FEATURE RESOLUTION |
| COLLECTION TIME |
| AREA COVERAGE |
| WEATHER EFFECTS |
| VEHICLE MOBILITY |
| TERRAIN FEATURES |
| OBSTRUCTIONS |
| MOBILITY CONTOURS |
| EQUIPMENT ID |
| SYSTEM ASSOCIATION |
| FUNCTIONAL ASSESSMENT |
| STRENGTH |
| COMPOSITION |
| AFFILIATION |
| COURSES OF ACTION |

FIG. 4

| PRODUCTS | ATTRIBUTES |
| --- | --- |
| AIR TASKING ORDER | • TARGET NAME<br>• TARGET ID NUMBER<br>• TIME ON TARGET<br>• TARGET LOCATION |
| TARGET LIST | • TARGET NAME<br>• TARGET ID NUMBER<br>• TARGET LOCATION |
| E/O IMAGERY | • DAYLIGHT VISIBLE<br>• GEO-RECTIFIED<br>• FEATURE RESOLUTION<br>• COLLECTION TIME<br>• AREA COVERAGE<br>• WEATHER EFFECTS |
| RADAR IMAGERY | • GEO-RECTIFIED<br>• FEATURE RESOLUTION<br>• COLLECTION TIME<br>• AREA COVERAGE<br>• WEATHER EFFECTS |
| TERRAIN ANALYSIS | • COLLECTION TIME<br>• VEHICLE MOBILITY<br>• TERRAIN FEATURES<br>• OBSTRUCTIONS<br>• MOBILITY CONTOURS |
| SIGNALS INTEL | • TARGET LOCATION<br>• COLLECTION TIME<br>• EQUIPMENT ID<br>• SYSTEM ASSOCIATION<br>• FUNCTIONAL ASSESSMENT |
| ORDER OF BATTLE | • TARGET LOCATION<br>• COLLECTION TIME<br>• STRENGTH<br>• COMPOSITION<br>• AFFILIATION<br>• COURSES OF ACTION |

FIG. 5

| ENVIRONMENT: | PROFILE | | | | |
|---|---|---|---|---|---|
| | SPACE | AIR | LAND | URBAN | LITTORAL | MARITIME |

(61)

| ECHELON: | | |
|---|---|---|
| JTF | JFACC | AIS |
| | JFLCC | DOCC |
| | JFMCC | CIC |
| | JFSOC | |

(62)

| FUNCTION/MISSION: | PLANS | COLLECTION MANAGEMENT | TARGETING | OPERATIONS | EXPLOITATION | RELOCATABLE TARGET DETECTION |

| ENVIRONMENT: | PROFILE | | | | |
|---|---|---|---|---|---|
| | SPACE | AIR | LAND | URBAN | LITTORAL | MARITIME |

(61)

| ECHELON: | | |
|---|---|---|
| JTF | JFACC | AIS |
| | JFLCC | DOCC |
| | JFMCC | CIC |
| | JFSOC | |

(62)

| FUNCTION/MISSION: | PLANS | COLLECTION MANAGEMENT | TARGETING | OPERATIONS | EXPLOITATION | RELOCATABLE TARGET DETECTION |

| PROFILE | | | ROLE DEFINITION | EXPERT USE CASE | | | PRODUCTS |
|---|---|---|---|---|---|---|---|
| ENVIRONMENT | ECHELON | FUNCTION/MISSION | | TYPE | | ACTORS | |
| • AIR | • AIS | • TARGETING<br>• RELOCATABLE TARGET DETECTION | • AIR ATTACK | • AIR ATTACK, TARGETING, RELOCATABLE TARGET DETECTION | | • AIR INTELLIGENCE SQUADRON | • AIR TASKING ORDER<br>• TARGET LIST<br>• E/O IMAGERY<br>• RADAR IMAGERY<br>• TERRAIN ANALYSIS<br>• SIGNALS INTEL<br>• ORDER OF BATTLE |
| • URBAN | • JFLCC | • TARGETING<br>• OPERATIONS | • GROUND ARMOR ATTACK | • GROUND ATTACK, COMMAND ELEMENT TARGETING, LINES OF COMMUNICATION DENIAL | | • MANEUVER FORCES, TANK AND ARTILLERY | • AIR TASKING ORDER<br>• TARGET LIST<br>• E/O IMAGERY<br>• RADAR IMAGERY<br>• TERRAIN ANALYSIS<br>• SIGNALS INTEL<br>• ORDER OF BATTLE |

| Attribute Probabilities | Air Tasking Order | | Target List | | E/O Imagery | | Radar Imagery | | Terrain Analysis | | Signals Intel | | Order of Battle | |
|---|---|---|---|---|---|---|---|---|---|---|---|---|---|---|
| | Reflects | Exists | Reflects | Exists | Reflects | Exists | Reflects | Exists | Reflects | Exists | Reflects | Exists | Reflects | Exists |
| Target Name | 0.7 | 1 | 0.7 | 1 | | | | | | | | | | |
| Target ID Number | 0.7 | 1 | 0.7 | 1 | | | | | | | | | | |
| Time on Target | 0.8 | 1 | | | | | | | | | | | | |
| Target Location | 0.4 | 1 | 0.3 | 1 | | | | | | | | | | |
| Daylight Visible | | | | | 0.9 | 1 | | | | | | | | |
| Geo-Rectified | | | | | 1 | 1 | 1 | 1 | | | | | | |
| Feature Resolution | | | | | 0.7 | 0.8 | 0.7 | 1 | | | | | | |
| Collection Time | | | | | 0.6 | 1 | 0.6 | 1 | 0.7 | 1 | 0.9 | 0.8 | 0.7 | 0.6 |
| Area Coverage | | | | | 1 | 0.7 | 1 | 1 | | | | | | |
| Weather Effects | | | | | 0.6 | 1 | 1 | 1 | | | | | | |
| Vehicle Mobility | | | | | | | | | 0.8 | 0.9 | | | | |
| Terrain Features | | | | | | | | | 0.8 | 0.7 | | | | |
| Obstructions | | | | | | | | | 0.9 | 0.8 | | | | |
| Mobility Contours | | | | | | | | | 0.9 | 0.9 | | | | |
| Equipment ID | | | | | | | | | | | 0.9 | 0.4 | | |
| System Association | | | | | | | | | | | 0.9 | 0.3 | | |
| Functional Assessment | | | | | | | | | | | 0.9 | 0.3 | | |
| Strength | | | | | | | | | | | | | 0.6 | 0.7 |
| Composition | | | | | | | | | | | | | 0.6 | 0.7 |
| Affiliation | | | | | | | | | | | | | 0.9 | 0.8 |
| Courses of Action | | | | | | | | | | | | | 0.8 | 0.3 |
| Product Rel. Probabilities | 0.65 | 1.00 | 0.56 | 1.00 | 0.80 | 0.56 | 0.86 | 0.70 | 0.82 | 0.45 | 0.90 | 0.11 | 0.73 | 0.05 |
| Product Cond. Probabilities | 0.243 | | 0.209 | | 0.168 | | 0.224 | | 0.138 | | 0.004 | | 0.013 | |
| Resulting Product Rank | 1 | | 3 | | 4 | | 2 | | 5 | | 7 | | 6 | |

ATTRIBUTES

PRODUCTS

FIG. 10

| Attribute Probabilities | Air Tasking Order | | Target List | | E/O Imagery | | Radar Imagery | | Terrain Analysis | | Signals Intel | | Order of Battle | |
|---|---|---|---|---|---|---|---|---|---|---|---|---|---|---|
| | Reflects | Exists | Reflects | Exists | Reflects | Exists | Reflects | Exists | Reflects | Exists | Reflects | Exists | Reflects | Exists |
| Target Name | 0.7 | 0.6 | 0.7 | 0.9 | | | | | | | | | | |
| Target ID Number | 0.7 | 0.6 | 0.7 | 0.8 | | | | | | | | | | |
| Time on Target | 0.8 | 0.4 | | | | | | | | | | | | |
| Target Location | 0.4 | 0.2 | 0.6 | 0.9 | 0.9 | 1 | | | | | 0.9 | 0.4 | 0.9 | 0.7 |
| Daylight Visible | | | | | 1 | 1 | | | | | | | | |
| Geo-Rectified | | | | | 1 | 1 | 1 | 1 | | | | | | |
| Feature Resolution | | | | | 0.6 | 0.8 | 0.5 | 1 | | | | | | |
| Collection Time | | | | | 0.6 | 1 | 0.6 | 1 | 0.9 | 1 | 0.9 | 0.7 | 0.7 | 0.6 |
| Area Coverage | | | | | 1 | 1 | 0.9 | 0.7 | | | | | | |
| Weather Effects | | | | | 0.6 | 1 | 1 | 1 | 0.9 | 1 | | | | |
| Vehicle Mobility | | | | | | | | | 0.9 | 1 | | | | |
| Terrain Features | | | | | | | | | 0.9 | 0.9 | | | | |
| Obstructions | | | | | | | | | 0.9 | 0.9 | | | | |
| Mobility Contours | | | | | | | | | 0.9 | 1 | | | | |
| Equipment ID | | | | | | | | | | | 0.7 | 0.4 | | |
| System Association | | | | | | | | | | | 0.9 | 0.6 | | |
| Functional Assessment | | | | | | | | | | | 0.9 | 0.6 | | |
| Strength | | | | | | | | | | | | | 0.7 | 0.8 |
| Composition | | | | | | | | | | | | | 0.8 | 0.8 |
| Affiliation | | | | | | | | | | | | | 0.9 | 0.6 |
| Courses of Action | | | | | | | | | | | | | 0.9 | 0.6 |
| Product Rel. Probabilities | 0.65 | 0.03 | 0.67 | 0.65 | 0.78 | 0.80 | 0.80 | 0.70 | 0.90 | 0.81 | 0.86 | 0.04 | 0.82 | 0.10 |
| Product Cond. Probabilities | 0.008 | | 0.174 | | 0.253 | | 0.226 | | 0.294 | | 0.014 | | 0.032 | |
| Resulting Product Rank | 7 | | 4 | | 2 | | 3 | | 1 | | 6 | | 5 | |

ATTRIBUTES

PRODUCTS

METHOD AND APPARATUS FOR INTELLIGENT INFORMATION RETRIEVAL

TECHNICAL FIELD OF THE INVENTION

This invention relates in general to information retrieval and, more particularly, to a method and apparatus for facilitating information retrieval by a person unfamiliar with relevant retrieval characteristics such as source names, content and/or source capabilities.

BACKGROUND OF THE INVENTION

There are many applications in which a person seeks to retrieve structured and/or unstructured data or information from databases or documents. However, the person is often unknowledgeable or unfamiliar with retrieval characteristics such as the retrieval source names, context and/or source capabilities. As a result, the person may locate little or none of the available information of interest.

As one specific example, a military officer involved in planning an operation may be seeking certain intelligence information that will facilitate planning of the mission, such as recent aerial photographs, weather information, data regarding the relevant terrain, and so forth. Although the officer will be very familiar with the context and terminology of military operations, he or she may have little or no knowledge regarding the context and terminology used by the intelligence community in storing and classifying the information of interest.

One prior approach to this problem has been the generation of complex templates in structure query language. However, these templates require substantial user training, are difficult to use, and are not readily extensible. A different known approach involves the use of keyword and/or concept based search engines. However, such approaches do not accommodate user specific situation criteria that describe the context of the needed information. Thus, these search engines present problems similar to those involved with structure query language templates, including but not limited to the need for substantial user training.

SUMMARY OF THE INVENTION

From the foregoing it may be appreciated that a need has arisen for a method and apparatus for effecting information retrieval by a person familiar with a context and/or terminology different from the context and/or terminology involved in accessing the information. According to the present invention, a method and apparatus are provided to address this need, and involve: maintaining a list of informational products; accepting input from a user in a user context familiar to the user; maintaining expert information developed by at least one expert which provides correlation between the user context and informational products in the list; and selecting a subset of the products as a function of the user input and the expert information.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
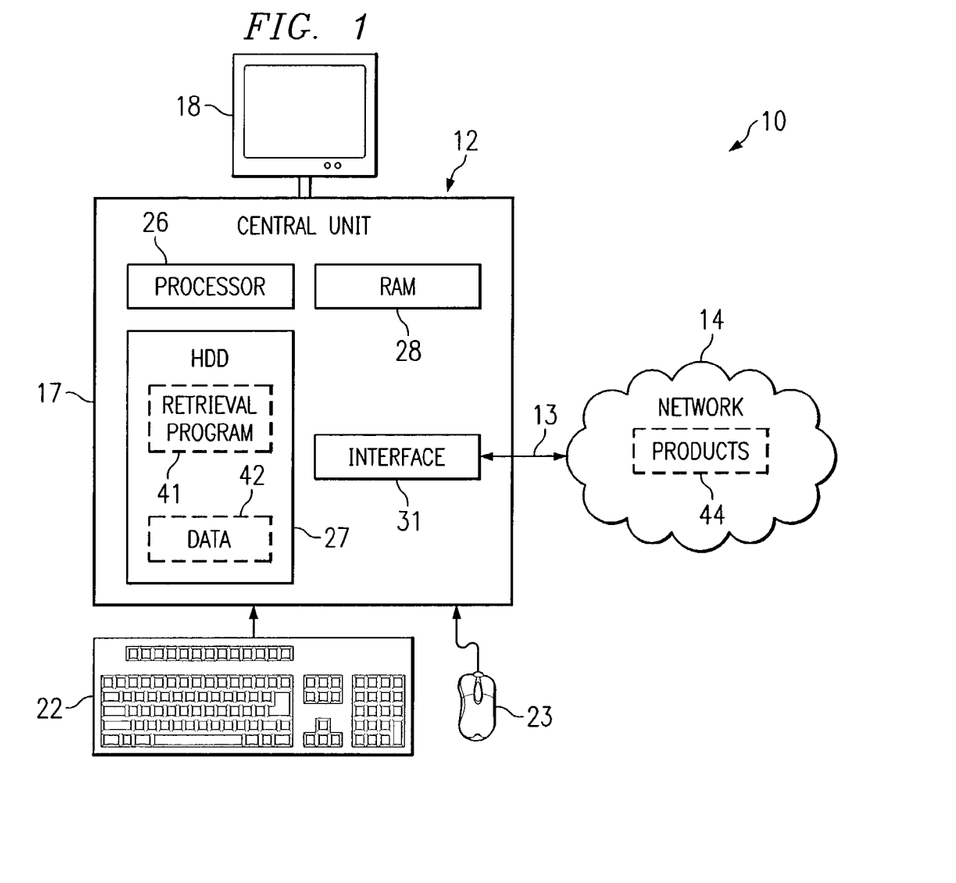
FIG. 1 is a block diagram of a computer system which embodies aspects of the present invention.

FIG. 1 is a block diagram of an apparatus which is a computer system 10. The computer system 10 includes a personal computer or workstation 12, which is operatively coupled by a cable 13 to a network 14. The hardware of the computer 12 is a commercially available configuration, and may for example be a personal computer of the type which is readily commercially available from Dell Computer Corporation of Austin, Tex.

The network 14 may include some or all of the Internet, an intranet, a local area network (LAN), a wide area network (WAN), and/or some other form of communications arrangement that can interact with a computer. In the disclosed embodiment, the network 14 carries some information which carries a security classification such as "secret", and thus is a closed and secure network which can be accessed only by users with appropriate authorization. However, there are other applications for the present invention in which the network could be open to the public.

Turning in more detail to the computer 12, the computer 12 includes a central unit 17 which is coupled to a display 18, and which can receive user input by means of a keyboard 22 and/or a pointing device 23 such as a mouse. The central unit 17 includes a processor 26, which in the disclosed embodiment is processor of a type commercially available under the trademark PENTIUM from Intel Corporation of Santa Clara, Calif. However, the processor 26 could alternatively be any other suitable type of processor. The central unit 17 also includes a hard disk drive (HDD) 27. In a standard manner, the HDD 27 contains an operating system which is executed by the processor 26, one or more application programs which can be selectively executed by the processor 26, and data files that can be utilized by the processor 26.

The central unit 17 also includes some random access memory (RAM) 28, which is used by the processor 26 for storage of programs and/or data while the processor 26 is operational. Information stored in the RAM 28 is lost when power to the central unit 17 is turned off, and so the RAM 28 is used only for transitory storage of information. The central unit 17 also includes an interface circuit 31, which permits the central unit 17 to communicate with the network 14 through the cable 13. The interface circuit 31 may include a standard modem, a standard network interface, or some other appropriate circuit, depending on the nature of the interface through the cable 13 to the network 14.

The HDD 27 stores an intelligent information retrieval program 41 which can be executed by the processor 26, and also stores data 42 which is associated with the program 41. The program 41 and the data 42 are discussed in more detail later, and for now it is sufficient to point out that the program 41 is used to selectively retrieve products 44 stored at one or more locations within the network 14. For example, the products 44 may be available from a number of different servers scattered throughout the network 14. For purposes of clarity, all products used in the disclosed embodiment are accessed through the network 14, but it would alternatively be possible for at least some of the products to be stored within the computer 12, for example on the HDD 27.

As discussed in more detail later, the computer system 10 in the embodiment of FIG. 1 happens to be used in a military context, in particular to help a military officer identify and access information that may help the officer plan a military operation, such as locating and destroying a selected target such as a mobile rocket launcher of an adversary. However, this military context is merely one example of an application for the present invention. The present invention can also be used in a variety of other applications that involve information retrieval, including entirely non-military applications.

Figure 2:
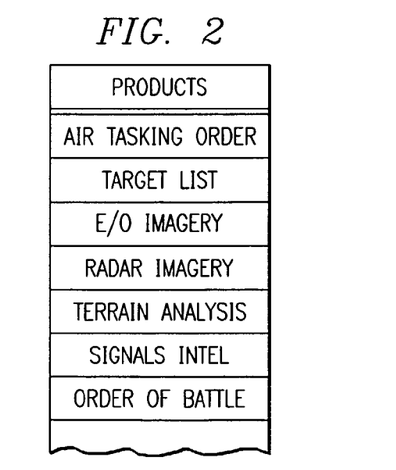
FIG. 2 is a diagram showing a list of products utilized in the system of FIG. 1.

FIG. 2 is a diagram representing a list of the products 44. The list in FIG. 2 includes seven products, which are considered a suitable example of products for the purpose of explaining one exemplary application of the present invention. The list shown in FIG. 2 could include products additional to those shown in FIG. 2, but those additional products need not be shown or described in detail here in order to convey a clear understanding of the present invention. Moreover, the present invention is compatible with applications in which the products involved are entirely different from the exemplary products shown in FIG. 2.

Referring to the list of products in FIG. 2, the "Air Tasking Order" product is a list of aircraft assignments, such as the current locations of available aircraft. The "Target List" product is a list of potential targets. The "E/O Imagery" product refers to electro-optical images, or in other words images based on visible light, rather than on other types of radiation, such as thermal images or radar images. E/O imagery might, for example, include a reconnaissance photograph taken from an airplane or satellite. The "Radar Imagery" product includes images generated using radar technology, for example by a radar system in a reconnaissance plane.

The "Terrain Analysis" product includes up-to-date information regarding the type of terrain in a specified area of interest, and the current state of that particular terrain. For example, one area may have a desert terrain, whereas a different area may have tropical rain forest terrain. Further, for a given area, conditions such as the current weather can affect the state of the terrain. For example, an area that is normally dry could currently be flooded due to recent heavy rains. The "Signals Intel" product involved intercepted communications, such as an intercept of a radio transmission by an adversary. The "Order of Battle" product is a list of available military units and equipment, for example throughout the world.

Figure 3:
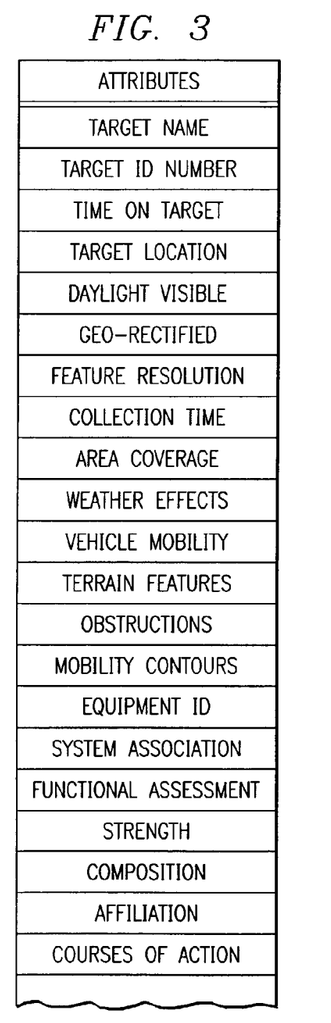
FIG. 3 is a diagram showing a list of attributes utilized in the system of FIG. 1.

Each of the products shown in FIG. 2 is associated with one or more attributes. FIG. 3 is a diagram showing a list of attributes utilized in the disclosed embodiment. The list in FIG. 3 includes twenty-one attributes, which are considered a suitable example of attributes for purposes of explaining one exemplary application of the present invention. The list shown in FIG. 3 could include attributes additional to those specifically listed in FIG. 3, but those additional attributes need not be shown or described in detail here for purposes of conveying a clear understanding of the present invention. Moreover, the present invention is compatible with applications in which the attributes involved are entirely different from the exemplary attributes shown in FIG. 3.

Turning in more detail to the specific exemplary attributes listed in FIG. 3, the "Target Name" attribute is an arbitrary name which can be assigned to a particular target for convenience, such as "Cave 52" or "Zazzo Air Base". The "Target ID Number" is an arbitrary and unique identification number or code which can be assigned to a particular target for purposes of convenience and accuracy in identifying that particular target. The "Time on Target" attribute is the time that a target will be reached. As one example, it may be the time that an aircraft will be over the target. The "Target Location" attribute is the location of a target of interest, for example as expressed in latitude and longitude.

The "Daylight Visible" attribute is an indication of whether something of interest is visible in daylight. Depending on whether or not the item is visible in daylight, visible imagery such as aerial photographs may or may not provide useful information. The "Geo-Rectified" attribute is used to identify images which have been processed so as to improve them. For example, a photograph taken from a satellite may be adjusted so as to eliminate obliqueness caused by the curvature of the earth's surface. The "Feature Resolution" attribute relates to the resolution of an image such as a radar image or an E/O image, and identifies the size of the smallest feature which can be seen in the image. For example, in a satellite photograph with a low resolution, it may be possible to discern an ocean liner but not smaller details such as the presence of a person standing on the deck of the ocean liner. On the other hand, in a satellite photograph with a high resolution, it may be possible to discern not only the ocean liner, but also smaller details, such as the fact that a person is standing on its deck. The "Collection Time" attribute identifies a time frame or a point in time at which the associated information was gathered. The "Area Coverage" attribute refers to the amount of area covered by associated information. For example, an aerial photograph may show one square mile, or a thousand square miles.

The "Weather Effects" attribute is an indication of the extent to which the associated information can be affected by weather. For example, satellite photographs of a specified region may or may not be useful, depending on whether the region is currently free of clouds or subject to heavy cloud cover. The "Vehicle Mobility" attribute relates to various characteristics of the mobility of a vehicle, such as its speed and maneuverability in various different environments. For example, a vehicle which is fast and maneuverable on a hard surface may be virtually useless if the terrain of interest is swampy. The "Terrain Features" attribute relates to various characteristics of the terrain, including the nature of the terrain and its topographical composition. The "Obstructions" attribute relates to considerations that can affect mobility, such as a river which many vehicles cannot cross, a cliff which would impede progress of many types of vehicles, or a bridge which has been rendered unusable.

The "Mobility Contours" attribute represents information derived through analytical evaluation based on factors such as terrain features and vehicle mobility. As one example, the contours may be a series of nested lines on a map which represent respective probability contours as to the maximum distance that a particular target may have moved from a prior known location within respective different periods of time.

The "Equipment ID" attribute is an arbitrary identification number that may be assigned to a piece of military equipment of an adversary, for purposes of convenience and accuracy in referring to that particular piece of equipment. For example, a particular mobile rocket launcher could be assigned a unique identification number in order to permit it to be easily and accurately identified.

The "System Association" attribute is an identification code for a larger system, in which a particular target may be a part of the larger system. The "Functional Assessment" attribute is an evaluation of the function and capability of a particular item of interest. The "Strength" attribute is an indication of how many items of a given type are present. For example, where an item of interest is a mobile rocket launcher, an adversary may have several mobile rocket launchers, and the "Strength" attribute would give the number of these mobile rocket launchers. The "Composition" attribute provides an indication of whether the items of interest are all the same, or have different capabilities. For example, if an opponent has several mobile rocket launchers, some may be of one type and others may be of a different type. The "Composition" attribute would reflect this and also give a sense for how many of each type are preset. The "Affiliation" attribute is an indication of the country or entity which is associated with a particular target or item of interest. The "Courses of Action" attribute reflects an analytical assessment or estimate of future capability or intention. Assuming that a given target is a mobile rocket launcher, this attribute may include an assessment of whether it is expected to remain stationary for a specified period of time (for example for at least 30 minutes while it is halted for refueling), or whether it is expected to be on the move relatively soon (for example within 5 minutes).

Figure 4:
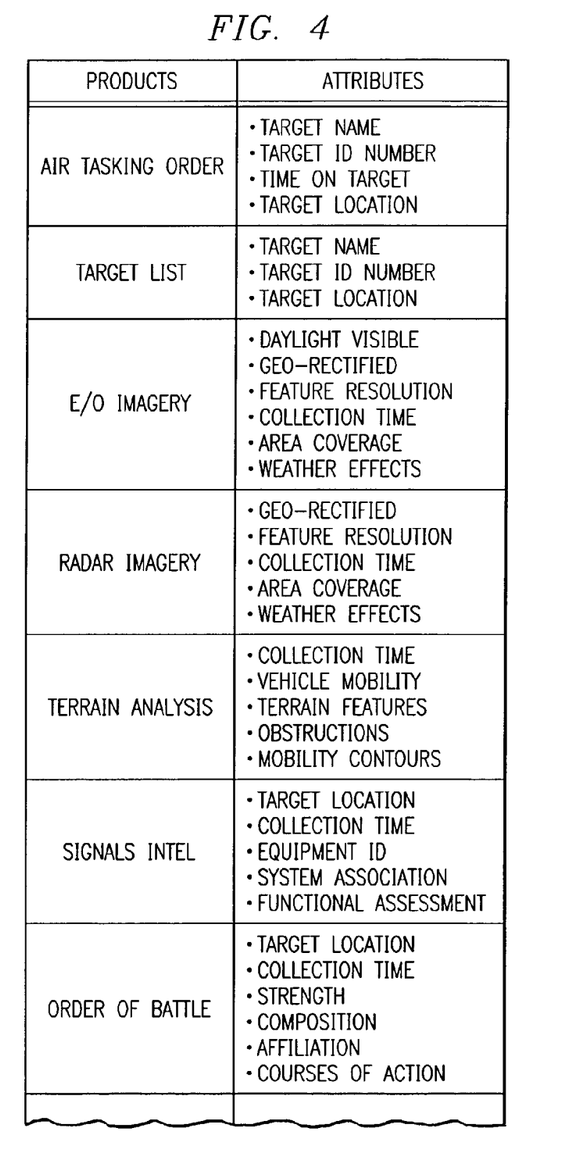
FIG. 4 is a diagram showing a table that defines a relationship between the attributes of FIG. 3 and the products of FIG. 2.

As mentioned above, each of the products shown in FIG. 2 is associated with one or more of the attributes shown in FIG. 3. In this regard, FIG. 4 is a diagram showing a table or database which indicates how, in the disclosed embodiment, the products listed in FIG. 2 are each associated with one or more of the specific attributes listed in FIG. 3. It will be noted that a given attribute may be associated with more than one product. For example, FIG. 4 shows that the "Target Location" attribute is associated with several different products, including "Air Tasking Order", "Target List", "Signals Intel" and "Order of Battle".

Figure 5:
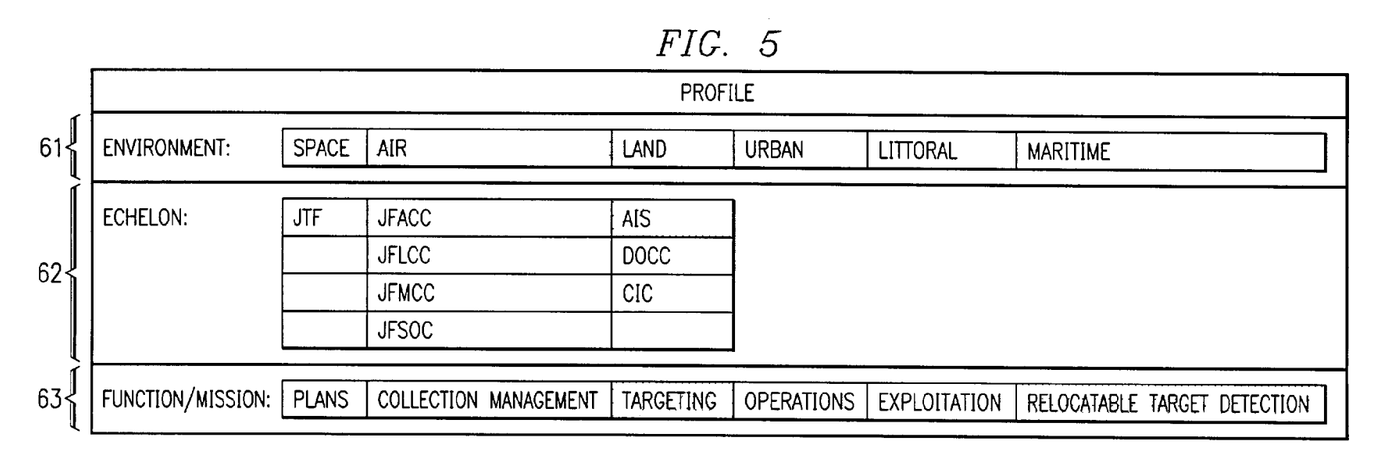
FIG. 5 is a diagram of an exemplary input screen which a person can use in order to enter information into the system of FIG. 1, and shows one specific example of user input.

Referring again to FIG. 1, the computer program 41 can present on the display 18 an input screen which a human operator/user can utilize to enter information in a context that is familiar to the user and does not require special training. For example, FIG. 5 is a diagram of a screen which the program 41 presents on the display 18 in order to obtain user input, which is referred to here as a profile of a proposed operation or mission. The illustrated screen includes three sections 61, 62 and 63, which respectively correspond to information regarding an "Environment", a military "Echelon", and a "Function/Mission" of interest.

With reference to the Environment section 61 in FIG. 5, the user can select from six options, which are "Space", "Air", "Land", "Urban", "Littoral", and "Maritime". In the Echelon section 62, the user can specify the military echelon which is to be responsible for the proposed operation. In this regard, FIG. 5 shows that the user has eight possible selections for echelon, which are arranged in three columns. Each column represents a different level within the military hierarchy, with the highest level on the left and the lowest level on the right. The available options are "JTF" (Joint Task Force), "JFACC" (Joint Forces Air Component Commander), "JFLCC" (Joint Forces Land Component Commander), "JFMCC" (Joint Forces Maritime Component Commander), "JFSOC" (Joint Forces Special Operations Commander), "AIS" (Air Intelligence Squadron), DOCC (Deep Operations Coordination Cell), and "CIC" (Combat Information Center). The Function/Mission section 63 of the screen in FIG. 5 presents the user with six possible selections, which are "Plans", "Collection Management", "Targeting", "Operations", "Exploitation", and "Relocatable Target Detection".

It will be noted in FIG. 5 that the user has selected four of the available options, which are the highlighted options and which define a profile for a particular proposed operation or mission. In particular, the specific highlighted options in FIG. 5 are "Air" in the Environment section 61, "AIS" in the Echelon section 62, and "Targeting" and "Relocatable Target Detection" in the Function/Mission section 63.

The screen shown in FIG. 5 is one example of how an input profile screen might be formatted, but the screen could alternatively have a variety of other configurations. Further, the specific selections available to the user in this screen are exemplary, and it would alternatively be possible to have additional selections, or to have selections which are entirely different from those shown in FIG. 5.

Figure 6:
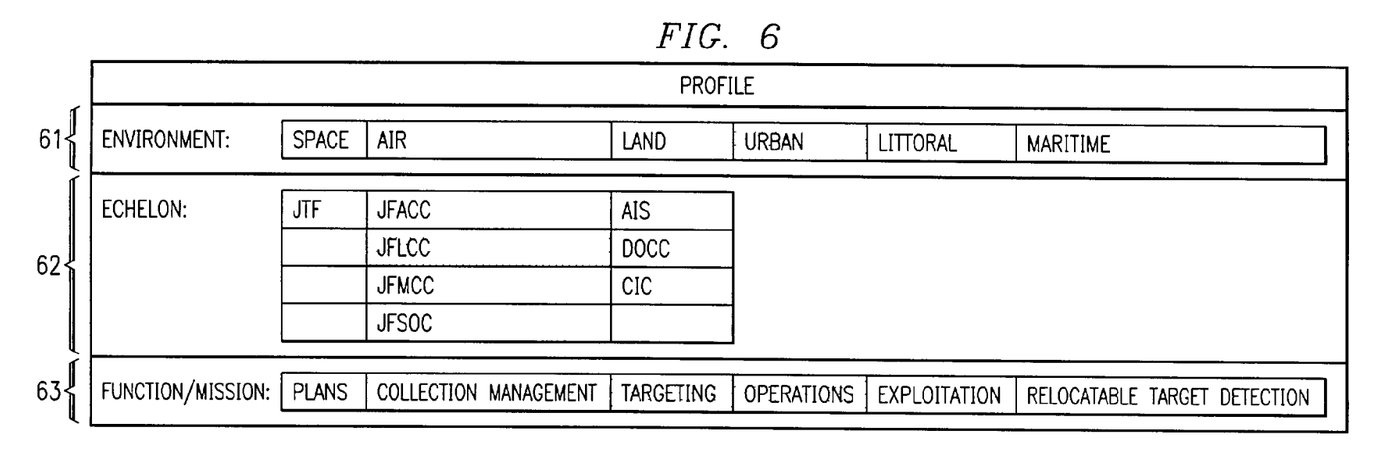
FIG. 6 is a view similar to FIG. 5, but showing a different specific example of user input.

FIG. 6 is a diagrammatic view which is similar to FIG. 5 and shows the same profile screen, but which shows different user selections representing a profile for a different proposed mission or operation. In particular, in FIG. 6, the user has selected "Urban" in the Environment section 61, "JFLCC" (Joint Forces Land Component Commander) in the Echelon section 62, and "Targeting" and "Operations" in the Function/Mission section 63.

Figure 7:
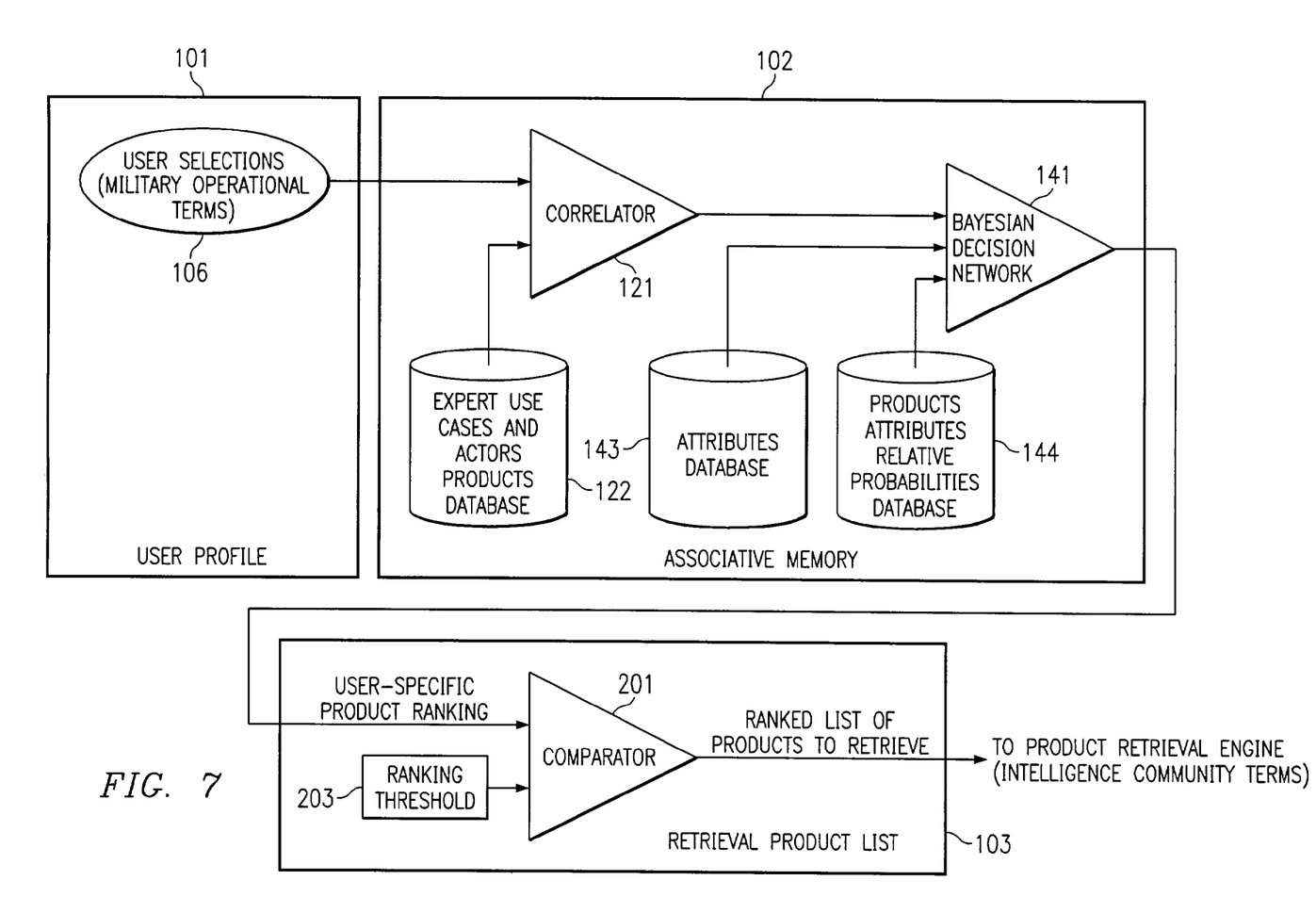
FIG. 7 is a block diagram showing certain operations carried out by a computer program which is part of the computer system of FIG. 1.

Turning now in more detail to the retrieval program shown at 41 in FIG. 1, FIG. 7 is a block diagram showing at a very high level some selected aspects of how information is processed by the program 41. Informational flow is represented generally by three successive sections, including a user profile section 101, an associative memory section 102, and a retrieval product list section 103. In the user profile section 101, block 106 represents the input obtained from the user through the display 18 (FIG. 1), in the form of the profile screen shown in FIGS. 5 and 6. The profile screen shown in FIGS. 5 and 6 requests and accepts input in a context which is highly familiar to the relevant user, who in this case is likely to be a military officer. Thus, the terminology and organization used in the screen of FIGS. 5 and 6 are built around military operations. In some other application, for example a non-military application, the terminology and organization of the screen would be tailored to a context familiar to the particular user for that application.

In FIG. 7, the user information obtained in the block 106 of the user profile section 101 is supplied to the associative memory section 102, and in particular to a correlator 121 within the associative memory section. The correlator 121 correlates the user input with information from a database 122. In the disclosed embodiment, the database 122 is part of the data 42 (FIG. 1) stored on HDD 27. However, the database 122 could alternatively be stored at some other location within the network 14, provided the program 41 had knowledge of where the database 122 was stored.

Figure 8:
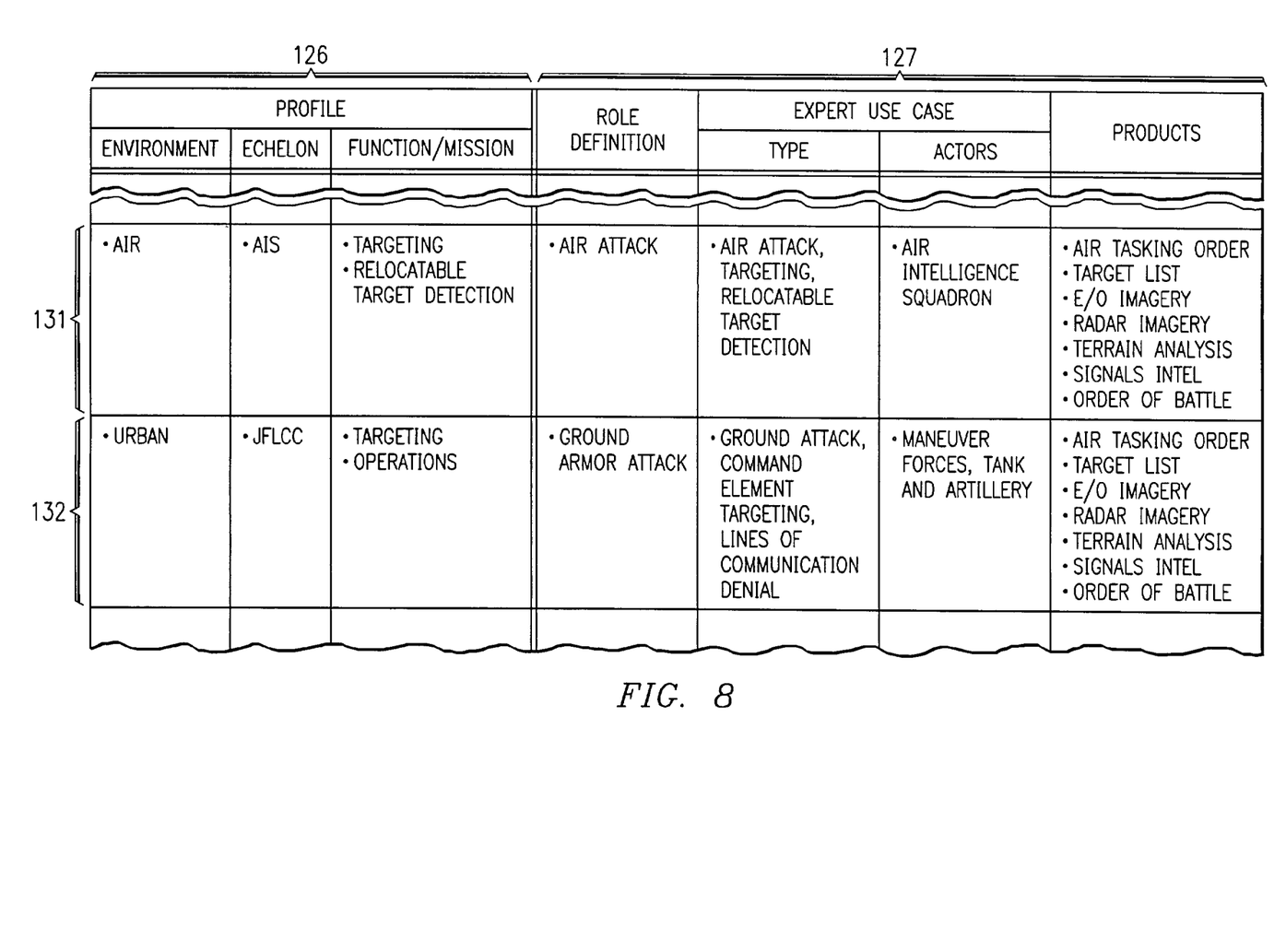
FIG. 8 is a diagram showing a table which is used by the system of FIG. 1, and which associates expert information with respective user input scenarios.

FIG. 8 is a diagrammatic view of a table which represents the information stored within the database 122. The table includes a portion 126 containing profile information, and a portion 127 containing expert information. FIG. 8 shows only two rows of the table, which are respectively identified by reference numerals 131 and 132. The table actually includes many additional rows, but the two illustrated rows 131 and 132 are sufficient for purposes of conveying an understanding of the present invention.

It will be noted that the profile information 126 in row 131 is identical to the user-specified profile information shown in FIG. 5, and that the profile information 126 in row 132 is identical to the user-specified profile information in FIG. 6. Stated differently, when the user enters the specific combination of profile items shown in FIG. 5, the correlator 121 searches for a single corresponding row in the table of FIG. 8 (within database 122), which is the row 131. Similarly, when the user selects the specific combination of profile items shown in FIG. 6, the correlator 121 searches for a single corresponding row in the table of FIG. 8, which is the row 132.

For each row in the table of FIG. 8, one or more experts have taken the specific combination of profile items shown at 126 within that row, and have developed related expert information which is set forth in the portion 127 of the same row. For example, for the specific profile information shown at 126 in row 131, one or more experts have determined that the operation proposed by the user relates to an air attack, and in particular an air attack which involves targeting and detection of a relocatable target, and which would be carried out by the Air Intelligence Squadron. Further, with reference to the right column in the table of FIG. 8, the expert information includes an identification of one or more products which are from the list of FIG. 2 and which one or more experts believe are likely to be useful to a person trying to plan such an operation. In the row 131 of FIG. 2, all seven products from FIG. 2 have been identified, but other rows in the table of FIG. 8 may identify only a subset of the products shown in FIG. 2, and/or may identify other products in the list which are not specifically identified in FIG. 2.

In a similar manner, with reference to row 132 in FIG. 8, one or more experts have determined that, for the specific combination of profile items set forth at 126, the user is proposing a ground attack that will involve command element targeting and line communication denial, and which would be carried out by tank and artillery maneuver forces. Further, with reference to the right column in FIG. 8, one or more experts have identified a list of relevant products for the proposed operation. Row 132 happens to identify all seven products specifically listed in FIG. 2, but as noted above it would be possible for row 132 to identify a subset of these seven products, and/or to identify other products which are part of the product list but which are not specifically identified in FIG. 2.

Referring again to FIG. 7, the correlator 121 takes the information from the selected row of the table of FIG. 8, and supplies it to a Bayesian decision network 141. The Bayesian decision network 141 also receives information from an attributes database 143, and a products attributes relative probabilities database 144. In the disclosed embodiment, the databases 143 and 144 are each part of the data 42 stored on the HDD 27 of the computer 12. However, either or both could alternatively be stored at some convenient location within the network 14, so long as the retrieval program 41 knew the location of this information.

The attributes database 143 essentially includes the information shown in FIG. 4, or in other words an identification of which attributes are associated with each product. In this regard, the determination of which attributes should be associated with each product is yet another determination made by one or more experts, and then stored in the database 143 for use by the Bayesian decision network 141. The probabilities database 144 includes a large number of probability values that have been determined by one or more experts, and that may be adjusted by experts from time to time based on actual experience or other factors. The nature of the probability information stored in the database 144 will become clearer in the context of the discussion below regarding operation of the Bayesian decision network 141.

In particular, turning in more detail to the Bayesian decision network 141, persons skilled in the art are familiar with Bayes' theorem, which describes a relationship between the conditional probability of events and the probability that a specific event may occur. Bayes' theorem is used here to rank (describe the prioritized value of) specific intelligence products for their likelihood to reflect an operational event of interest to a specific user. For a specific proposed operation, such as the user input of FIG. 5 (and row 131 in FIG. 8), or else the user input of FIG. 6 (and row 132 in FIG. 8), there exists a set of events for which a user desires to maximize the probability that the available intelligence products (FIG. 2) will reflect the operational event, for example through detection, identification and/or tracking. On a general level, this can be stated using Bayes' Theorem in the following manner:

$$P_r(\text{Product}_i \text{ reflects Operational Event}) = \frac{P_r(\text{Product}_i \text{ can reflect Operational Event}) * P_r(\text{Product}_i \text{ exists})}{\sum_{i=1 \text{ to } N} P_r(\text{Product}_i \text{ can reflect Operational Event}) * P_r(\text{Product}_i \text{ exists})}$$

Figure 9:
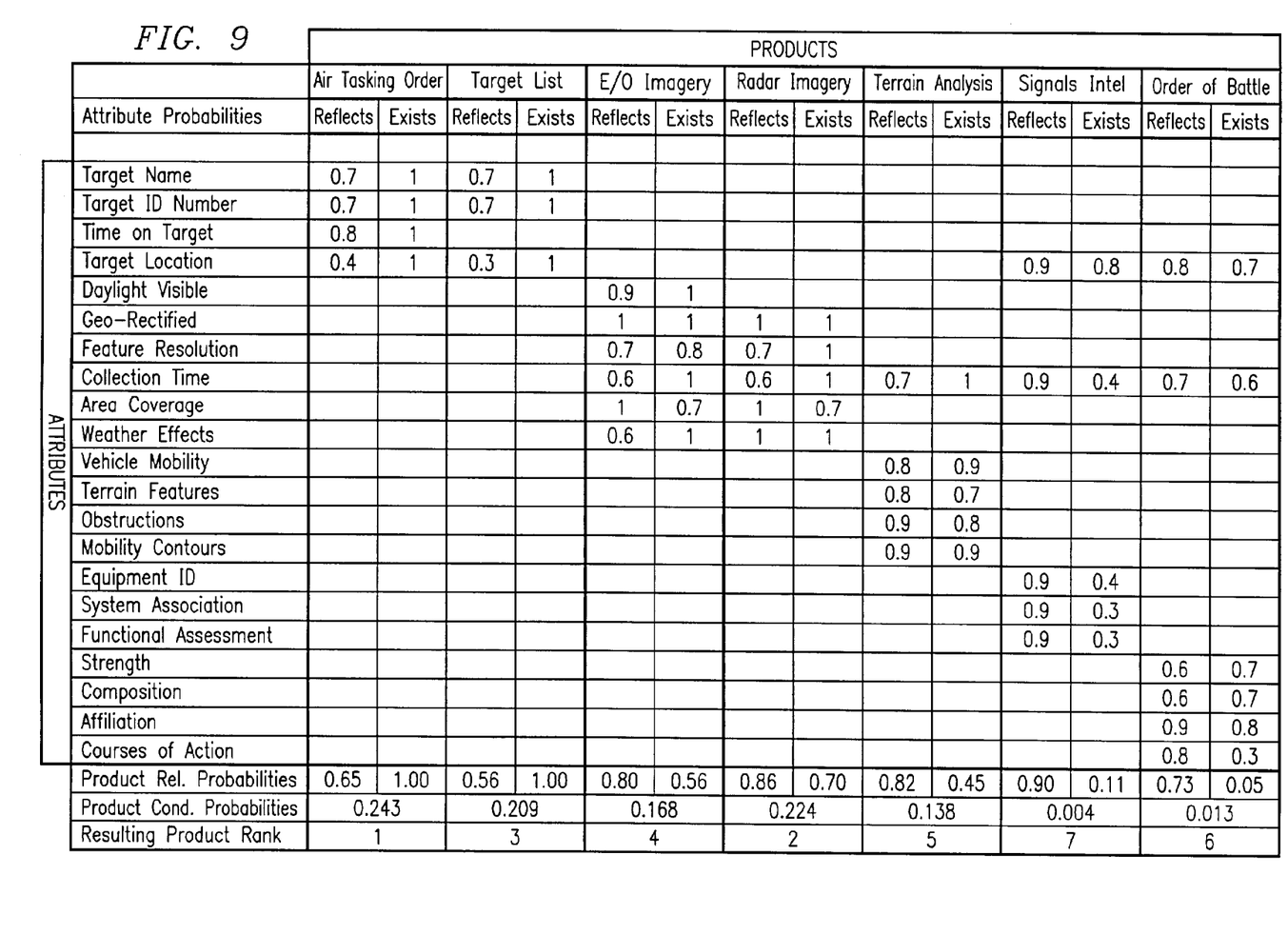
FIG. 9 is a diagram of a table showing aspects of a decisional process carried out by the computer system of FIG. 1 for the specific exemplary user input of FIG. 5.

The manner in which this theorem is incorporated into the Bayesian decision network 141 can be understood with reference to FIG. 9, which is a chart having the seven products of FIG. 2 listed across the top, and the twenty-one attributes of FIG. 3 listed along the left side. It will be noted in FIG. 9 that the column for each product includes probability values for each of the attributes associated with that product. As one specific example, FIG. 4 shows that the product "Air Tasking Order" is associated with four attributes. In FIG. 9, it will be noted that the column for this product includes probability information for each of these four associated attributes, and in particular includes two probability values for each attribute. The right probability value is a probability value which reflects the probability that the particular product exists, and the left value represents the probability that, assuming the product exists, the product will reflect the event or information of interest. All of the probability values shown in FIG. 9 are part of the information in the probabilities database 144 (FIG. 7).

Figure 10:
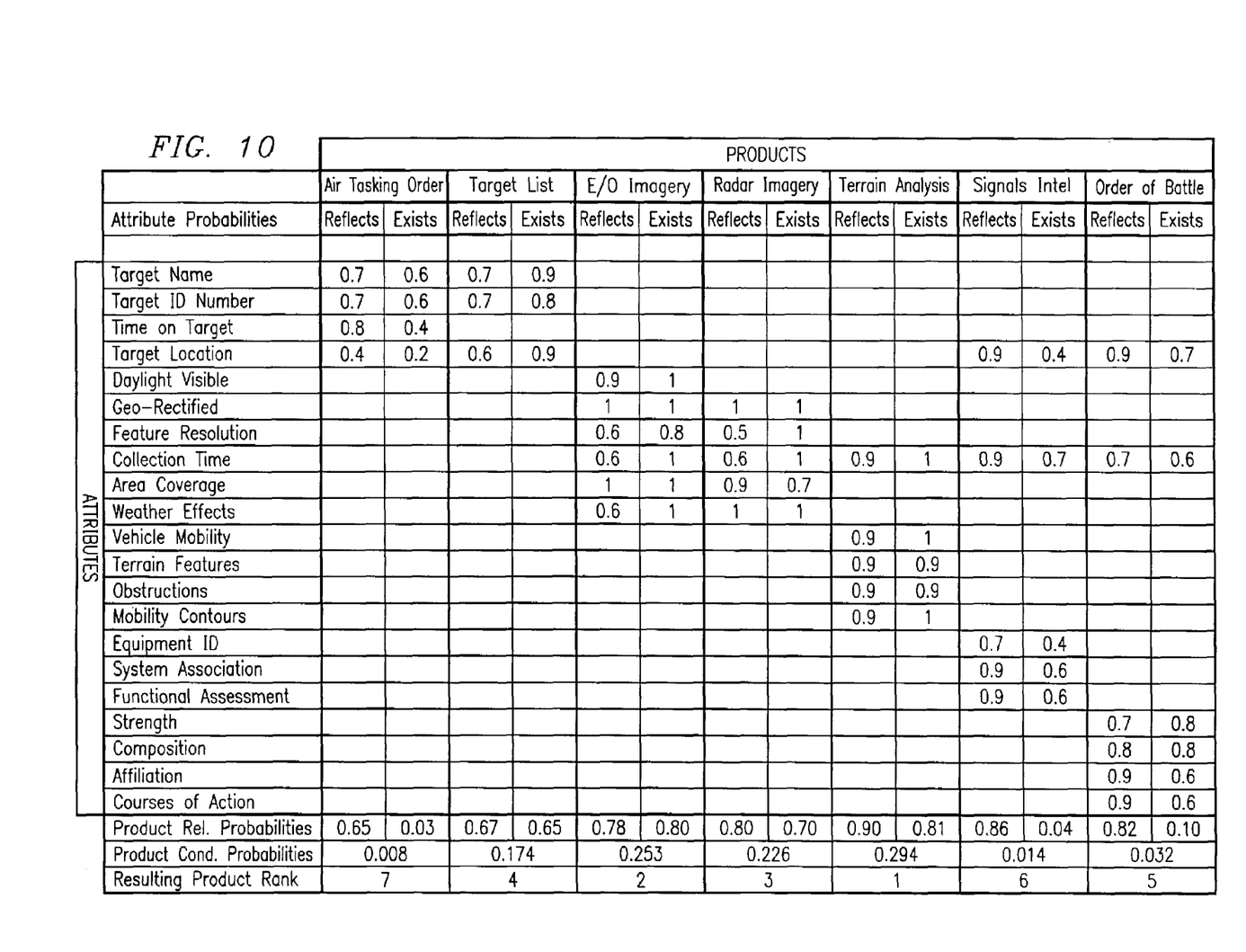
FIG. 10 is a diagram of a table which is similar to the table of FIG. 9, but which shows aspects of the decisional process for the specific exemplary user input of FIG. 6.

FIG. 10 is a diagram similar to FIG. 9, except that it contains a different set of probability values, which correspond to the user input represented by FIG. 6 and by row 132 of FIG. 8. Thus, in the disclosed embodiment, the probabilities database 144 effectively includes a respective set of probability values for each row in the table of FIG. 8. As mentioned earlier, the probability values in the database 144, including those shown in the tables of FIGS. 9 and 10, are determined by one or more experts, and may be adjusted by experts from time to time, based on experience and other relevant factors.

In each of the tables of FIGS. 9 and 10, the second to last row includes product relative probability values, which are each calculated from the probability values set forth above them in the same column. In more detail, those in each "Reflects" column are calculated according to the equation:

$$PRP(\text{Reflect}) = \frac{P_1(\text{Reflect}) + P_{i+1}(\text{Reflect}) + \ldots + P_N(\text{Reflect})}{N}$$

where $P_i$ is the attribute probability, and N is the number of attribute probabilities values in the column. Further, the product relative probability values in each "Exists" column are calculated according to the following equation:

$$PRP(\text{Exist}) = P_i(\text{Exist}) * P_{i+1}(\text{Exist}) * \ldots * P_N(\text{Exist})$$

where $P_i$ is the attribute probability, and N is the number of attribute probability values in the column. The next to last row in each table sets forth product conditional probability values, which are each calculated from the product relative probability values in the immediately proceeding row, according to the equation:

$$PCP = \frac{P_1(\text{Reflect}) * P_1(\text{Exist})}{\sum_{i=1 \text{ to } N} P_1(\text{Reflect}) * P_1(\text{Exist})}$$

where $P_i$ is the product probability, and N is the number of products.

In the tables of FIGS. 9 and 10, the final row of each table sets forth for each listed product a respective unique integer which is a rank value. These rank values are determined directly by the relative magnitudes of the product conditional probability values set forth in the immediately proceeding row. Thus, for example, the highest product conditional probability value in FIG. 9 is 0.243 for the "Air Tasking Order" product, and so this product is given a rank value of 1. The second highest product conditional probability value is 0.224 for the "Radar Imagery" product, which therefore receives a rank value of 2. It will be noted that the ranking or order of the products in FIG. 9 is different from the ranking or order of the same products in FIG. 10. This reflects the fact that the products most likely to be useful for planning an air operation of the type addressed by FIG. 9 may be different from the products most likely to be useful for planning a land operation of the type addressed by FIG. 10.

It will thus be recognized that the use of Bayes' theorem in the disclosed embodiment provides a means to describe and therefore optimize the relationship between an operational event to be observed and other specified independent events such as intelligence collection, through analysis of the likelihood that the observed event will be reflected in the given specified intelligence events. As a specific example, the likelihood and therefore the ranked value to a user that a reconnaissance imaging activity will show a relocatable missile launcher can be estimated based on the fractional analysis of the individual intelligence products relative likelihoods that a relocatable missile launcher is reflected in the intelligence product and the relative probability of the product to exist.

With reference to FIG. 7, the Bayesian decision network 141 supplies to a comparator 201 of the retrieval product list section 103 a ranked list of products, which is determined in the manner discussed above in association with FIGS. 9 and 10. The comparator 201 compares the product conditional probability values (for example as shown in the next-to-last row of the tables of FIGS. 9 and 10) to a ranking threshold 203. In the disclosed embodiment, the ranking threshold is determined by one or more experts and may be adjusted by experts from time to time based on experience. However, it would alternatively be possible for the ranking threshold 203 determined by the experts to serve as an initial or default threshold value, and for the user to have the capability to selectively adjust the threshold 203 through use of the keyboard 22 and/or the mouse 23 (FIG. 1).

In the present discussion, it is assumed for the sake of example that the ranking threshold 203 has a expert-determined value of 0.200. The comparator 201 compares the calculated product conditional probability value for each product to the threshold 203, and outputs a list containing only the highest-ranked products, namely those which have a product conditional probability value in excess of the threshold value. Thus, with reference to FIG. 9, the products passed by the comparator 201 to its output would be "Air Tasking Order", "Radar Imagery", and "Target List", which are respectively ranked 1, 2 and 3. With reference to FIG. 10, the products passed by the comparator 201 to its output would be "Terrain Analysis", "E/O Imagery", and "Radar Imagery", which are respectively ranked 1, 2 and 3. Although the examples of FIGS. 9 and 10 each happen to yield three products which meet the threshold requirement, the number of products output by the comparator 201 could be higher or lower, and would typically vary from one user profile to another. The ranked list of products which the comparator 201 supplies to its output are then supplied to a not-illustrated product retrieval engine of a known type, which retrieves each of those selected products from the network 14 (FIG. 1), and then presents the retrieved products to the user of the computer 12 for study and analysis.

It will be noted that the output of the comparator 201 effectively represents a translation of the user input at 106 in the form of military operational terminology into a list of products in intelligence community terminology. This facilitates the intelligent selection and presentation to the user of relevant intelligence community products, without any need for a user familiar with military operational terminology to undergo training in intelligence products, intelligence community terminology, and the like. Thus, the retrieval product list is the result of converting a list of retrieval product attributes such as time, location, resolution, geospatial orientation, sensor type, and/or movement detection into a list of products to retrieve, such as a radar map and/or an infrared image. This conversion includes correlation of the attribute list with a product list, in a manner determining the minimum product set needed to encompass the product attributes, with emphasis on reducing product redundancy.

The present invention provides a number of technical advantages. One such technical advantage is the provision of a user interface which communicates with a user using terminology and a context that are familiar to the user, after which the user input is converted as a function of expert information into an information request that may use terminology and/or a context that are not familiar to the user. This permits the user to obtain relevant information without necessarily being knowledgeable in, or undergoing specialized training with respect to, the specific terminology and context in which the information is stored. As a specific aspect of this, the translation of the user input into different terminology and/or a different context is carried out as a function of information developed by one or more experts.

Although one embodiment has been illustrated and described in detail, it will be understood that substitutions and alterations are possible without departing from the spirit and scope of the present invention, as defined by the following claims.

What is claimed is:

1. A computer implemented method, comprising:

maintaining a list of informational products;

accepting input from a user in a user context familiar to the user, said user input defining one of a plurality of predetermined scenarios;

maintaining expert information developed by at least one expert which provides correlation between said user context and informational products in said list, said expert information including for each said scenario a definition of a respective corresponding group of said products, wherein said maintaining said expert information includes:

maintaining probability information for each of said products, and     maintaining for each of said products a respective list of attributes, said probability information for each said product including respective probability information for each said attribute of that product, wherein said maintaining probability information includes maintaining for each said attribute of each said product a first probability representative of whether that product exists and a second probability representative of whether that product includes information relevant to a scenario defined by the user input; and selecting the group of said products corresponding to the respective scenario defined by said user input; and using said probability information to rank said products in said group.

2. A computer implemented method according to claim 1, wherein said maintaining probability information includes maintaining for each said attribute of each said product a respective set of said first and second probabilities for each said scenario for which that product is in the corresponding group.

3. A computer implemented method according to claim 1, wherein said using said probability information to rank said products includes calculating for each said product a third probability which is a function of said first and second probabilities for each of said attributes associated with that product, and effecting said ranking of said products based on said third probabilities.

4. A computer implemented method according to claim 3, wherein said calculating said third probabilities includes a calculation according to Bayes theorem.

5. An apparatus comprising a computer system which:

maintains a list of informational products;

accepts input from a user in a user context familiar to the user, said user input defining one of a plurality of predetermined scenarios;

maintains expert information developed by at least one expert which provides correlation between said user context and informational products in said list, said expert information including for each said scenario a definition of a respective corresponding group of said products wherein said expert information includes:

probability information for each of said products, and for each of said products a respective list of attributes, said probability information for each said product includes respective probability information for each said attribute of that product, and said probability information includes for each said attribute of each said product a first probability representative of whether that product exists and a second probability representative of whether that product includes information relevant to a scenario defined by the user input;

selects the group of said products corresponding to the respective scenario defined by said user input; and uses said probability information to rank said products in said group.

6. An apparatus according to claim 5, wherein said probability information includes for each said attribute of each said product a respective set of said first and second probabilities for each said scenario for which that product is in the corresponding group.

7. An apparatus according to claim 5, wherein in the use of said probability information to rank said products said computer system calculates for each said product a third probability which is a function of said first and second probabilities for each of said attributes associated with that product, and then effects said ranking of said products based on said third probabilities.

8. An apparatus according to claim 7, wherein in effecting said calculation of said third probabilities said computer system utilizes a calculation according to Bayes theorem.

* * * * *